(No Model.)
C. HEISLER.
COFFEE POT.
No. 483,554. Patented Oct. 4, 1892.
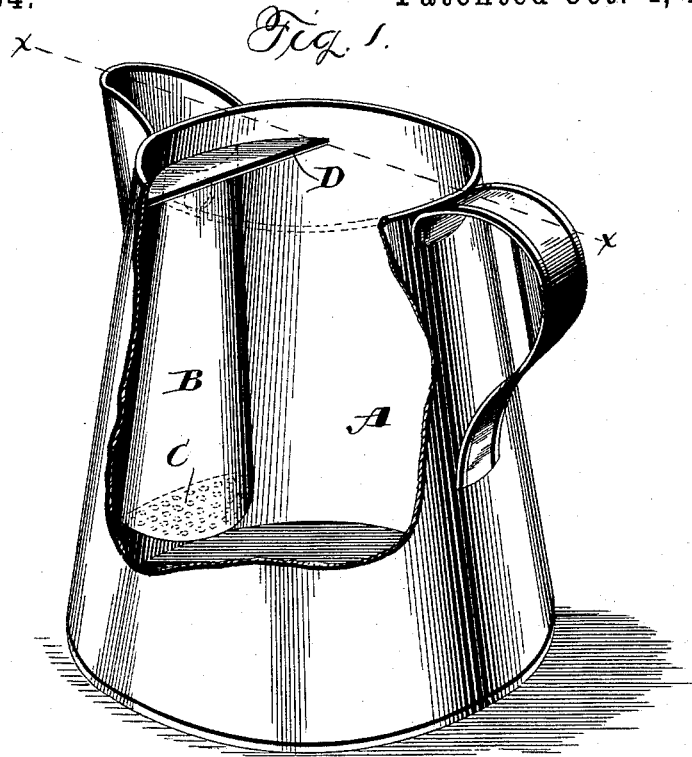
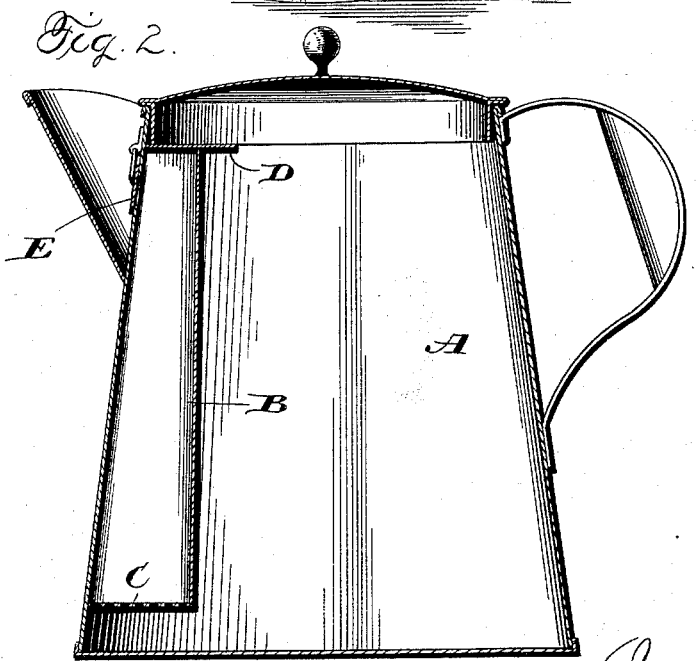
Witnesses
C. J. Williamson.
R. L. Hough
Inventor
Charles Heisler,
by Franklin H. Hough
his Atty.

United States Patent Office.

CHARLES HEISLER, OF ALTOONA, PENNSYLVANIA.

COFFEE-POT.

SPECIFICATION forming part of Letters Patent No. 483,554, dated October 4, 1892.

Application filed June 27, 1892. Serial No. 438,120. (No model.)

*To all whom it may concern:*

Be it known that I, CHARLES HEISLER, a citizen of the United States, residing at Altoona, in the county of Blair and State of Pennsylvania, have invented certain new and useful Improvements in Coffee-Pots; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in coffee-pots, and especially to that class in which provision is made to retain the steam as much as possible, and hence retaining the strength of the coffee while the same is steeping.

My invention consists, further, in the novel construction, combination, and adaptation of the parts, as will be more fully described hereinafter, and then specifically defined in the appended claim.

The invention is clearly illustrated in the accompanying drawings, which, with the letters of reference marked thereon, form a part of this specification, like letters of reference indicating like parts throughout both views, in which—

Figure 1 is a perspective view of a coffee-pot constructed in accordance with my invention, with parts broken away to better illustrate the interior construction. Fig. 2 is a vertical section on line $x\ x$ of Fig. 1.

Reference now being had to the details of the drawings by letter, A represents the body of the coffee-pot constructed in accordance with my invention.

B is a partition of a semi-conical shape, having the perforated bottom C, and the top portion D is extended so as to form a preventative from allowing the coffee running out around the cover when tilted for pouring coffee through the spout. The said partition, having the integral bottom perforated, and the guard D, also integral with the partition, are soldered to the side of the pot, so as to cover the passage leading to the spout, and at a convenient distance from the bottom of the pot, so as to be below the surface of the liquid, thus retaining a large amount of the strength of the coffee and also retaining the heat within the pot, so that when the same is placed on a table the coffee will be kept hot for a considerable length of time.

E is a valve which is provided to cover the aperture through which the coffee is poured into the spout to retain any steam which would arise from the coffee standing within the partitioned portion.

The perforation in the bottom of the partition is so constructed as to retain the grounds of coffee and not allow them to pass out with the coffee when being poured from the pot.

Having thus described my invention, what I claim to be new, and desire to secure by Letters Patent, is—

In a coffee-pot, the combination of the body portion having a spout with valved aperture, a partition over a portion of the interior surface, including the spout-aperture, and extending from near the rim of said pot to a short distance from the bottom, the bottom of said partition being perforated and the top portion being extended to prevent coffee from spilling when the same is being poured through the spout, all substantially as shown and described.

In testimony whereof I affix my signature in presence of two witnesses.

CHARLES HEISLER.

Witnesses:
E. A. BARGE,
H. L. MURRAY.